(12) United States Patent
Rolinson et al.

(10) Patent No.: US 12,143,536 B2
(45) Date of Patent: *Nov. 12, 2024

(54) INTELLIGENT MATCHING OF A USER TO AN AGENT FOR A COMMUNICATION SESSION

(71) Applicant: American Express Travel Related Services Company, Inc., New York, NY (US)

(72) Inventors: Stuart Rolinson, Cave Creek, AZ (US); Sibish Basheer, Phoenix, AZ (US); Mariswaran Balasubramanian, Phoenix, AZ (US)

(73) Assignee: AMERICAN EXPRESS TRAVEL RELATED SERVICE COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,464

(22) Filed: Dec. 20, 2023

(65) Prior Publication Data

US 2024/0129408 A1 Apr. 18, 2024

Related U.S. Application Data

(63) Continuation of application No. 17/455,987, filed on Nov. 22, 2021, now Pat. No. 11,902,468.

(51) Int. Cl.
*H04M 3/523* (2006.01)
*G06N 20/00* (2019.01)
*G06Q 10/0631* (2023.01)
*H04M 3/51* (2006.01)

(52) U.S. Cl.
CPC .......... *H04M 3/5233* (2013.01); *G06N 20/00* (2019.01); *G06Q 10/063112* (2013.01); *H04M 3/5175* (2013.01); *H04M 2203/408* (2013.01)

(58) Field of Classification Search
CPC . G06N 20/00; G06Q 10/063112; H04M 3/51; H04M 3/5175; H04M 3/523; H04M 3/5233; H04M 2203/408
USPC .......................... 379/265.11, 265.12, 265.13
See application file for complete search history.

(56) References Cited

U.S. PATENT DOCUMENTS

| | | | |
|---|---|---|---|
| 7,831,467 B1 * | 11/2010 | Lefebvre | G06Q 30/0224 705/14.1 |
| 11,902,468 B1 * | 2/2024 | Rolinson | G06Q 10/063112 |
| 2009/0110182 A1 * | 4/2009 | Knight, Jr. | H04M 3/5233 379/265.12 |
| 2014/0140498 A1 * | 5/2014 | Mezhibovsky | H04M 3/5141 379/265.13 |

(Continued)

*Primary Examiner* — Harry S Hong
(74) *Attorney, Agent, or Firm* — Thomas Horstemeyer, LLP

(57) ABSTRACT

Embodiments for intelligently matching a user to an agent for a communication session are disclosed. In one example, a system that comprises a computing device that is configured to initiate a first communication session with a first agent client device and generate interaction data associated with the user from the first communication session. A user segment classification is determined for a user account. A user request is received to initiate a second communication. The computing device identifies an agent account of a second agent to participate in the second data communication session. T second communication session is initiated between a client device and a second agent client device associated with the agent account.

20 Claims, 7 Drawing Sheets

(56) References Cited

U.S. PATENT DOCUMENTS

| | | | | |
|---|---|---|---|---|
| 2014/0164312 | A1* | 6/2014 | Lynch | G06Q 30/00 |
| | | | | 706/50 |
| 2016/0036978 | A1* | 2/2016 | Rybachenko | H04M 3/5233 |
| | | | | 379/265.11 |
| 2016/0057284 | A1* | 2/2016 | Nagpal | H04M 3/5232 |
| | | | | 379/266.07 |

* cited by examiner

| Interaction Type | Input Element | Transform Logic | Output Data |
|---|---|---|---|
| Survey | RTF Score e.g. 10 | None | RTF Score e.g. 10 |
| Survey | Comment e.g. "I had a great experience" | Extract, Intent List, Confidence Score, sentiment e.g. customer_satisfied | Intent: Customer_satisfied Confidence : 90 Sentiment : Happy |
| Chat Interaction | Customer Says — "Hi, I am having trouble using my card at the restaurant, had a worst experience. I need to cancel my card" Agent Says — "Extremely sorry to hear the trouble that you went with while using our card. Please let me research to find the reason, I will help you with the next steps" | Extract<br>• Intent details<br>• Confidence score<br>• Overall Sentiment<br>• Message Sentiment | Message Intent Message Confidence Score Message Sentiment Message Interaction Score Conversation Interaction Score Customer Empathy Score |
| Chat speed | Time Taken between messages | Message Interval | Message Interval |
| Usage of Emojis | Emojis in text e.g. "I am feeling 🙂" | Extract Emoji, convert to specific sentiment | "I am feeling Joy" |

FIG. 3

| Interaction Type | Input Element | Transform Logic | Output Data |
|---|---|---|---|
| Chat Interaction | Customer Says – "Hi, I am having trouble using my card at the restaurant, had a worst experience. I need to cancel my card"<br><br>Agent Says – "Extremely sorry to hear the trouble that you went with while using our card. Please let me research to find the reason, I will help you with the next steps" | Extract<br>• Intent details<br>• Confidence score<br>• Overall Sentiment<br>• Message Sentiment<br>• Calculate Empathy score<br>• Calculate Interaction score | Message Intent<br>Message Confidence Score<br>Message Sentiment<br><br>Agent Empathy score<br>Agent Intent score<br>Agent Interaction score |
| Chat speed | Time Taken between messages | Message Interval | Message Interval |
| Usage of Emojis | Emojis in text<br>e.g. "Wish you a Happy Birthday 🎂" | Extract Emoji, convert to specific sentiment | "Happy Birthday Wishes" |
| Follow-up | Follow up Topic, Duration, Resolution | Correlate duration and resolution with survey response | Customer satisfaction score<br>Agent Efficiency score<br>Agent Empathy score<br>Agent Interaction score |

FIG. 4

| Interaction Type | Input Element | Agent Segmentation | | | | User Segmentation | | | |
|---|---|---|---|---|---|---|---|---|---|
| | | Empathy | Sentiment | Interaction | Group | Empathy | Sentiment | Interaction | Group |
| Chat Interaction | Customer Says – "Hi, I am having trouble using my card at the restaurant, had a worst experience. I need to cancel my card"<br><br>Agent Says – "Extremely sorry to hear the trouble that you went with while using our card. Please let me research to find the reason, I will help you with the next steps" | 10 | Pos | 10 | Premium | 4 | Neg | 2 | High Attention |
| Chat Interaction | Customer Says – "Hi, Thank you for helping with my travel. Without Amex I wouldn't have been able to return to US"<br><br>Agent Says – "Thank You Rob for reaching out to American Express to show your gratitude. We are extremely happy to help your most required time. We would strive to help you." | 10 | Pos | 10 | Premium | 10 | Pos | 10 | Medium Attention |

FIG. 5

INTELLIGENT MATCHING OF A USER TO AN AGENT FOR A COMMUNICATION SESSION

CROSS-REFERENCE TO RELATED APPLICATIONS

This application is a continuation of, claims priority to, and the benefit of, U.S. Ser. No. 17/455,987, filed Nov. 22, 2021, and entitled "INTELLIGENT MATCHING OF A USER TO AN AGENT FOR A COMMUNICATION SESSION," which are incorporated by reference herein in its entirety for all purposes.

BACKGROUND

Oftentimes, customers contact a customer service department in order to resolve a specific issue. Customers can contact the customer service department through a variety of different communication channels, such as a voice service, a messaging service, and other forms of communication. In some cases, agents are assigned to handle a set of specific tasks for the sake of efficiency and customer experience. Accordingly, an improved system and method for intelligently matching a user to an appropriate agent for a communication session is desired.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is a table of example user data elements for FIGS. 2 and 3 according to various embodiments of the present disclosure.

FIG. 4 is a table of example agent data elements for FIGS. 2 and 3 according to various embodiments of the present disclosure.

FIG. 5 is table of example data elements for a matching process from FIGS. 2 and 3 according to various embodiments of the present disclosure.

DETAILED DESCRIPTION

Figure 1:
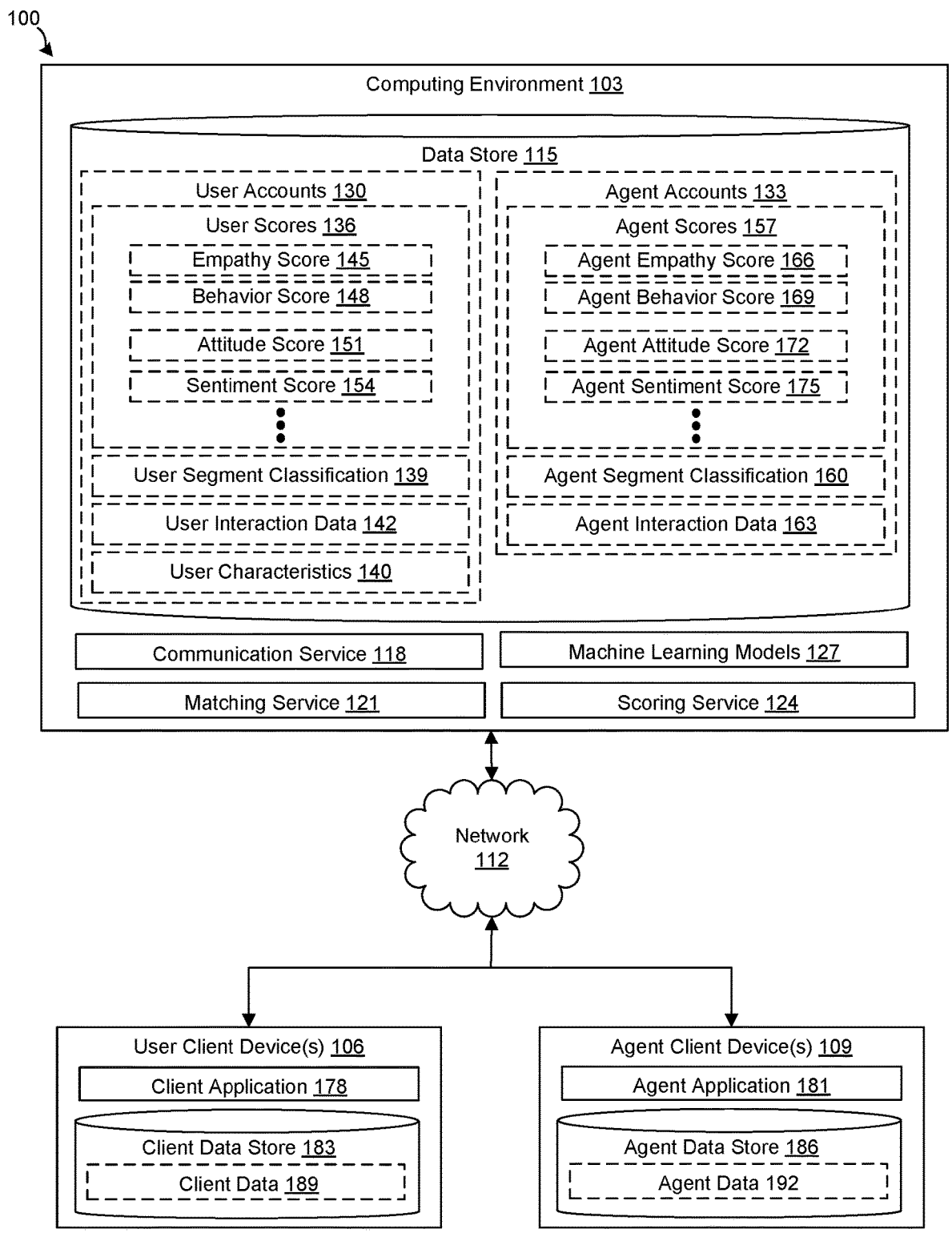
FIG. 1 is a drawing of a networked environment according to various embodiments of the present disclosure.

The embodiments of the present disclosure relate to intelligently matching users to an agent in a customer service context. In many cases, customers contact a customer service department in order to resolve a specific issue. Customers can contact the customer service department through a variety of different communication channels, such as a voice service, a messaging service, and other forms of communication. Agents can be assigned to handle a set of specific tasks for the sake of efficiency and customer experience. However, various agents can have different temperaments, and different personalities when conversing with customers in a variety of mental states. As such, some agents may not be well suited for resolving customer service issues of customers in certain moods, mental states, or with particular personalities.

For example, even though a first agent and a second agent may be capable of handling contract cancelations, the first agent may not be suited to handle irate, high-attention seeking customers. Instead, the first agent may be better suited to handle customers that are mild mannered or in a calm state of mind. The second agent may have a better performance record when dealing with irate, high-attention seeking customers. Thus, it would be preferable to route high-attention seeking customers to the second agent, when possible. As such, the embodiments have improved functionality to implicitly identify a mental state of a user and an agent from communication sessions. Therefore, some of the more practical applications of the various implementations would increase the likelihood that customers are routed to the agent best suited to communicate with them based on a present indication and/or prior indication of the mental state or mood of the customer.

Various embodiments of the present disclosure are directed to improved systems and methods for intelligently matching users to agents that are better suited for communicating with users in particular moods, mental states, or with certain personalities. As a result, the embodiments can involve classifying the users into certain user segments based on the messages (e.g., chat messages), the voice samples, feedback data (e.g., surveys) and other suitable communication input provided by the user during a customer service session. Likewise, the embodiments can involve classifying agents into certain user segments that the agents have a positive record of communicating and assisting the users with their issues. The agents can be classified by the messages (e.g., chat messages), voice samples, feedback data (e.g., surveys) and other suitable communication data associated with the agent during a customer service session. Additionally, the embodiments can dynamically update the user segment classifications and the agent segment classifications over time as more interactions occur with other users and agents. In the following discussion, a general description of the system and its components is provided, followed by a discussion of the operation of the same.

FIG. 1 depicts a networked environment 100 according to various embodiments. The networked environment 100 includes a computing environment 103, a user client device 106, and an agent client device 109, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, can include a communication service 118, a matching service 121, a scoring service 124, one or more machine learning models 127, and other applications, services, processes, systems, engines, or functionality not discussed in detail herein. The communication service 118 is executed to initiate and establish a communication session between a user and an agent. The communication service 118 can represent communication channels such as a webpage-based message service (e.g., instant message web page or instant messaging application), a mobile communication application (e.g., a voice or an instant messaging application), a virtual assistant chat service (e.g., Amazon's Alex®, Apple's Siri®, Apple's Business Chat, Google Assistant®), and other suitable communication services.

The matching service 121 is executed to match a user to an agent for a communication session. The matching service 121 can identify one or more potential agents for a user based on a combination of one or more of a set of user scores, a set of agent scores, a user segment classification, an agent segment classification, user interaction data, and other suitable data.

The scoring service 124 can collect data from the data store 115 and can generate new data elements, such as a set of user scores, a set of agent scores, user segment classifications, agent segment classifications, user characteristics, and other suitable data. In some embodiments, the scoring service 124 can analyze the collected data to determine a message intent, a message sentiment, an attitude, a mood, a feeling or other suitable data related to a mental state of the user. Thus, the scoring service 124 can be used to transform or interpret the raw collected data into an intent, a mood, an emotion, or a mental state of a person. In some embodiments, the scoring service 124 can use one or more machine learning models 127 to generate these new data elements.

The machine learning models 127 can be used to generate new data elements from interaction data, such as audio of communication sessions, chat messages, transcripts, and other suitable forms of interaction data. The machine learning models 127 can include natural language processing models such as Bidirectional Encoder Representations from Transformers (BERT), Robustly Optimized BERT Pretraining Approach (RoBerta), OpenAI's GPT2, and other suitable natural language processing models. The machine learning models 127 can also include sentiment analysis models that detect a sentiment and/or an emotion from audio and/or text data. Some other non-limiting examples of machine learning models 127 may include Naïve Bayes, discrete emotion models, and other suitable models.

The data stored in the data store 115 includes, for example, user accounts 130 and agent accounts 133, and potentially other data. The user accounts 130 can represent an account, a profile, or an identifier of a user that is contacting or interacting with an entity (e.g., a customer service department of a company). The user account 130 can include user scores 136, user segment classifications 139, user characteristics 140, user interaction data 142, and other suitable data.

The user scores 136 can represent a set of one or more scores that reflect different degrees of user characteristics 140 exhibited from a communication session with the user. Some non-limiting examples of user characteristics 140 can include a sentiment, a mood, an emotion, a mental state, a behavior, and other suitable user characteristics 140. As such, the scoring service 124 can generate one or more user characteristics 140, such as an empathy score 145, a behavior score 148, an attitude score 151, a sentiment score 154, and other suitable user characteristics. In another example, the scoring service 124 can also include user characteristics such as financial stability, social media engagement, digital adoption, and/or other suitable user characteristics.

The user segment classification 139 can represent a group classification for a user based on a combination of one or more of the user scores 136, the user interaction data 142, the user characteristics 140, and other suitable data. The user segment classification 139 can be useful for matching a user to an agent that is proficient in communicating and resolving issues with users in this classification. Some examples of a user segment classification 139 can include a high attention group, a low attention group, a premium status group, a mild-mannered group, and other suitable segment classifications.

The user characteristics 140 can include various mental states and attitudes of a user, such a sentiment, a mood, an emotion, a mental state, a behavior, and other suitable user characteristics 140. Also, the user characteristics 140 can represent other characteristics such as the user being associated with a certain status group (e.g., VIP club, Premium group, etc.), user location, financial stability, social media engagement, and other suitable characteristics.

The user interaction data 142 can represent stored communication sessions associated with the user client device 106 in the computing environment 103. The communication sessions can represent stored transcriptions of chat sessions and voice sessions that the user, via the user client device 106, participated. The user interaction data 142 can also include other forms of engagement or interaction with the user, such as feedback surveys and follow-up sessions.

The agent accounts 133 can represent an account, a profile, or an identifier of an agent associated with the entity. For example, the agent can be an individual that works in a customer service department of the entity. The agent can be responsible for answers to questions for the general public through various communication channels, such as a phone system, a chat platform, a virtual assistant, an instant message platform, and other suitable communication channels.

The agent account 133 can include agent scores 157, agent segment classifications 160, agent interaction data 163, and other suitable data. The agent scores 157 can represent a set of one or more scores that reflect different agent characteristics exhibited from the agent while communicating with various users. Some non-limiting examples of agent characteristics can include a sentiment, a mood, an emotion, a mental state, a behavior, and other suitable agent characteristics. As such, the scoring service 124 can generate one or more agent scores 157, such as, for example an agent empathy score 166, an agent behavior score 169, an agent attitude score 172, an agent sentiment score 175, and other suitable agent characteristics.

The agent segment classifications 160 can represent a group classification for an agent based on a combination of one or more of the agent scores 157, the agent interaction data 163, and other suitable data. The agent segment classification 160 can be useful for matching an agent to a group of users that the agent is proficient in communicating and resolving issues. For example, some agents may be more proficient in handling high attention seeking or demanding users than other agents.

The agent interaction data 163 can represent stored communication sessions associated with the agent in the computing environment 103. The communication sessions can represent stored transcriptions of chat sessions and/or voice sessions in which the agent participated. The agent interaction data 163 can also include other forms of engagement or interaction, such as feedback surveys and follow-up sessions collected regarding a session with the agent.

The user client device 106 and the agent client device 109 are representative of a plurality of client devices that may be coupled to the network 112. The user client device 106 and/or the agent client device 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The user client device 106 and/or the agent client device 109 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The user client device 106 may be configured to execute various applications such as a client application 178 and/or other applications. The client application 178 may also be executed in a user client device 106, for example, to access network content served up by the computing environment 103 and/or other servers, thereby rendering a user interface on the display. To this end, the client application 178 may comprise, for example, a browser, a dedicated application, etc., and the user interface may comprise a network page, an application screen, etc. The user client device 106 may be configured to execute applications beyond the client application 178 such as, for example, email applications, social networking applications, word processors, spreadsheets, and/or other applications.

The client application 178 can represent a communication interface (e.g., for voice or chat sessions) for enabling a user to communicate through one or more different communication channels with an agent. For example, the client application 178 can be used by a user to initiate a communication session with an agent in a customer service group of an entity. The client application 178 can be used to initiate a chat messaging application, to initiate a phone application, and other suitable communication mediums via the communication service 118.

The agent client device 109 may be configured to execute various applications such as an agent application 181 and/or other applications. The agent application 181 may be executed in an agent client device 109, for example, to access network content served up by the computing environment 103 and/or other servers, thereby rendering a user interface on the display. To this end, the agent application 181 may comprise, for example, a browser, a dedicated application, etc., and the user interface may comprise a network page, an application screen, etc. The agent client device 109 may be configured to execute applications beyond the agent application 181 such as, for example, email applications, social networking applications, word processors, spreadsheets, and/or other applications.

The agent application 181 can represent a communication interface for enabling an agent to communicate through one or more different communication channels with a user. For example, the agent application 181 can be used by an agent to establish a communication session with a user that desires to contact an individual about a customer service issue. The agent application 181 can be used to initiate a chat messaging application, to initiate a phone application, and other suitable communication mediums via the communication service 118.

Also, various data is stored in a client data store 183 and an agent data store 186 that are accessible to the user client device 106 and the agent client device 109. The data stored in the client data store 183 and the agent data store 186, for example, is associated with the operation of the various applications and/or functional entities associated with the user client device 106 and the agent client device 109. The client data store 183 can include client data 189 associated with communication sessions or feedback data collected by the user client device 106. The agent data store 186 can include agent data 192 associated with the communication sessions collected by the agent client device 109.

Next, a general description of the operation of the various components of the networked environment 100 is provided. To begin, a user may desire to contact a customer service department of an entity. The user may initiate a chat session with the client application 176. The client application 176 may transmit a request for a chat session to the communication service 118.

The communication service 118 can identify that the user is associated with a user account 130 that has no previous interactions with the computing environment 103. The communication service 118 can also identify a user intent, such as a reason for contacting the customer service department (e.g., product support, billing question, desire to cancel service or transaction account). The communication service 118 may determine a user intent from an initial message or from a selection of user interface components. Then, the communication service 118 can route the user client device 106 to a particular agent client device 109 of an agent that is capable of resolving the issue of the user.

During the chat session, the scoring service 124 can collect user interaction data 142 for processing. Each message during the chat session can be processed in order to generate user scores 136, user characteristics 140, agent scores 157, and other suitable data. After the end of the chat session, the communication service 118 can solicit feedback data, such as from a survey or a follow-up contact. The data can be stored in the user account 130 for the user. Then, the scoring service 124 can generate a user segment classification 139 based on one or more of the user scores 136, the user characteristics 140, and user interaction data 142.

Upon a subsequent interaction, the client application 178 can send a request to contact an agent. A user intent can be determined from an initial message or from a user interface selection, such as a desire to cancel a credit card account.

The communication service 118 can identify the user account 130 as having at least one previous interaction with the computing environment 103. The matching service 121 can retrieve data from the user account 130, such as the user scores 136, the user interaction data 142, and/or user segment classification 139. The user account data can be used to identify an appropriate agent account 133.

In one non-limiting example, the user segment classification 139 of the user can be used for finding a corresponding agent segment classification 160. For instance, the user segment classification 139 can be set to a High Attention group. A corresponding agent segment classification 160 may be an agent group for Premium clients. Within the Premium client group, the matching service 121 can identify an agent account 133 of an agent that is presently available and capable of handling users that want to cancel their credit cards. The matching service 121 can route the user client device 106 of the user to the agent client device 109 of the identified agent.

After the end of the chat session, the communication session can be stored as user interaction data 142 and/or agent interaction data 163. Additionally, each message in the chat session can be processed for updating the user scores 136, the agent scores 157, the user characteristics 140, and other suitable data.

Figure 2A:
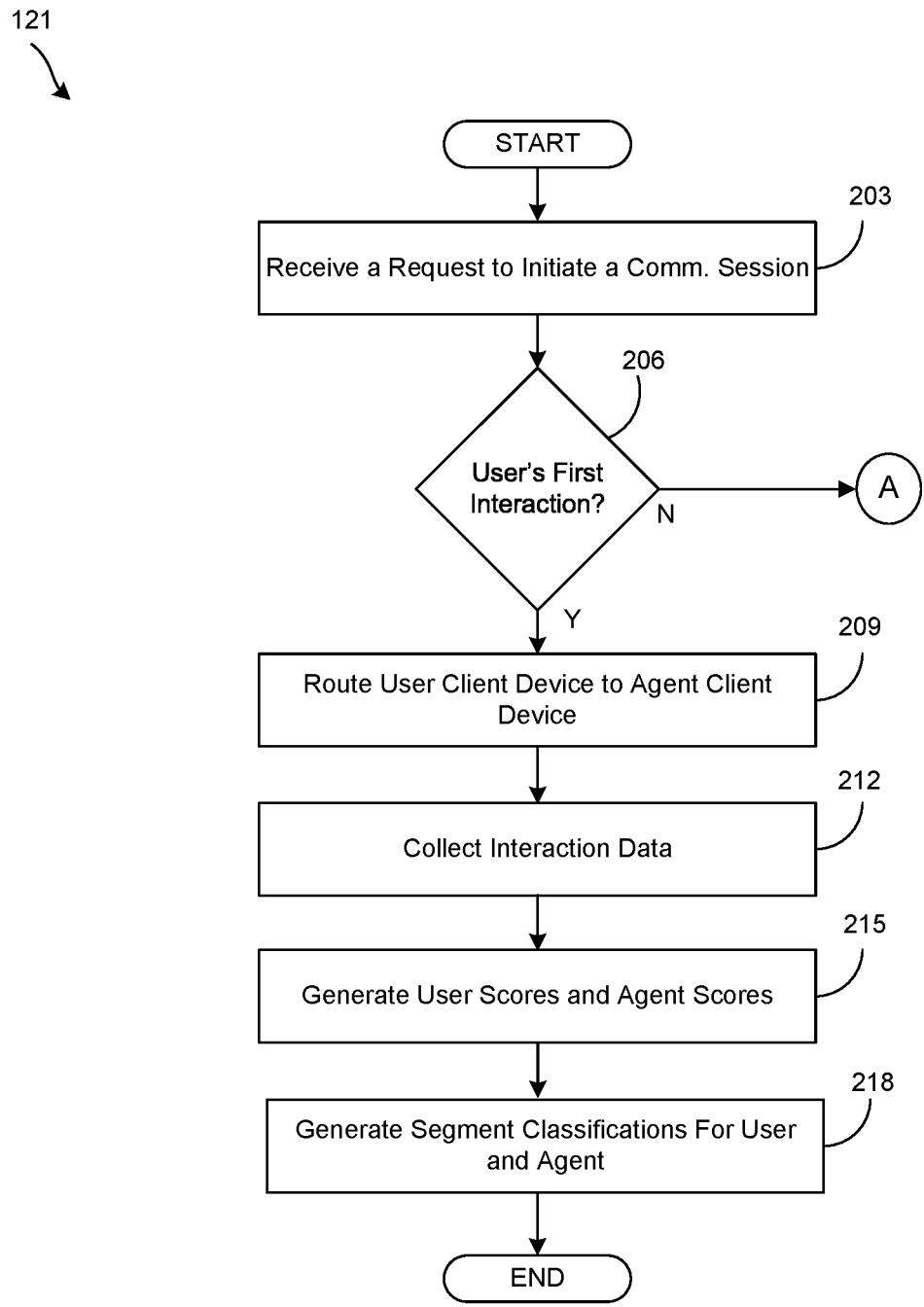
FIG. 2A is a flowchart illustrating one example of functionality implemented as portions of a matching service executed in a computing environment in the networked environment of FIG. 1 according to various embodiments of the present disclosure.

Referring next to FIG. 2A, shown is a flowchart that provides one example of the operation of a matching service 121 for matching a user to an agent in a customer service context according to various embodiments. In some alternative embodiments, the communication service 118 and/or the scoring service 124 may be involved in implementing portions of the operations for FIG. 2A. It is understood that the flowchart of FIG. 2 provides merely an example of the many different types of functional arrangements that may be employed to implement the operation of the matching service 121 as described herein. As an alternative, the flowchart of FIG. 2A may be viewed as depicting an example of elements of a method implemented in the computing environment 103 (FIG. 1) according to one or more embodiments.

Beginning with box 203, the matching service 121 can receive a request from a user client device 106 to initiate a communication session with an agent via an agent client device 109. For example, a user can use their user client device 106 to navigate to a web page of a company. The user can click on a "Chat with a customer representative" button on the web page. The click on the web page can generate a request to initiate a communication session with an agent. In some embodiments, the web page can generate one or more user interfaces for collecting user information, such as user credentials, a user identifier, a customer account, a payment identifier, a payment instrument, a customer order number, a customer receipt, or other suitable means for identifying a user.

In another example, the user may be identified by a token, a device identifier, and other user identifiers that can be communicated by the user client device 106 to the matching service 121. The identifying information can be useful for identifying a particular user account 130. The one or more interfaces can also be used to collect a particular issue or problem as the reason for the user initiating the communication session. For example, in a chat session, the user may enter the message "Cancel my credit card! I'm so frustrated!"

Next, in box 206, the matching service 121 can determine whether the present session is the first time the user has interacted with the computing environment 103. If this is not the first interaction with the computing environment 103, the matching service 121 proceeds to "A," which in turn proceeds to the boxes illustrated in FIG. 3. In some embodiments, the determination can be based on whether there is a user account 130 for the user. If there is a user account 130, the matching service 121 can determine if there are any previous communication sessions, which may be stored in the user interaction data 142. If this is the first interaction with the computing environment 103, the matching service 121 proceeds to the box 209.

In box 209, the matching service 121 can route or establish a communication session between the user client device 106 and an agent client device 109. In some embodiments, the routing can be based on the issue that the user wants resolved. For example, in the initial message, the user indicated a desire to cancel a credit card. As such, the matching service 121 can identify the user intent from the initial message and route the user to an agent that is skilled in cancelling credit card accounts. The communication session between the user client device 106 and the agent client device 109 can be stored as user interaction data 142. For instance, a transcript of a chat or vocal conversation can be stored for analysis.

After the termination of the session, the user client device 106 may provide feedback data regarding the communication session. For example, the user may fill out a survey for capturing the feelings or thoughts of the user as to their satisfaction for the interaction with the agent. The feedback data collected can also be stored as user interaction data 142.

In box 212, the matching service 121 can collect the user interaction data 142 from the communication session. The user interaction data 142 can be collected based on various criteria. Some example criteria can include customer interaction, upsell/cross sell opportunities and outcomes, issue resolution, follow-up conversation, survey responses from the user, and other suitable data related to the communication session. For example, the customer interaction can be stored as a transcript of a chat or vocal session between the user client device 106 and agent client device 109. The upsell/cross sell opportunities can include a list of potential opportunities for upselling and cross selling that were discussed with the agent client device 109. The outcome of the discussed opportunities can be stored. Issue resolution, follow-up conversations, and surveys can represent feedback data collected on the whether the desired issue was resolved and other user feedback on the interaction with the agent.

In box 215, the matching service 121 can generate user scores 136 and user characteristics 140 from the initial interactions (e.g., from the user interaction data 142) of the user client device 106. The matching service 121 can involve receiving the user interaction data 142 as input data and transforming or interpreting the input data into user scores 136 or user characteristics 140. Some examples of user characteristics 140 may include an intent classification (e.g., cancel card, product support, billing), a sentiment classification (e.g., positive, negative), user chat speed (e.g., fast, or slow), a vocal tone of user during a voice session, age group, a topic of interest (e.g., sports, favorite movies, favorite music, etc.), user location, and other suitable characteristics. In some embodiments, each message from the user client device 106 can be analyzed to generate a variety of user characteristics 140 and user scores 136. For example, the initial chat message provided by the user client device 106 can be processed to generate user scores 136 for a variety of different categories, such as an empathy score 145, behavior score 148, an attitude score 151, a sentiment score 154, and other suitable scoring categories. For instance, the initial message from the previous example stated "Cancel my credit card. I don't need it."

The matching service 121 can generate one or more user scores 136 (e.g., an empathy score 145, a behavior score 148, an attitude score 151, a sentiment score 154) based on the initial message. The set of user scores 136 can be stored in the user account 130. A second message by the user client device 106 may be "Hurry up!" in the conversation. The second message can generate a second set of user scores 136. Likewise, the matching service 121 can also generate or update a set of agent scores 157 for the agent based on responses provided by the communication session, which may be stored in the agent interaction data 163.

In box 218, the matching service 121 can generate a user segment classification 139 and in some cases, the matching service 121 may update the agent segment classification 160. The user segment classification 139 can be determined based on a combination of one or more user scores 136 and other user characteristics. For example, a user account 130 that indicates a low empathy score, a negative sentiment classification, and a low interaction score may be classified as a "High Attention" user. Other examples of user segment classification 139 can include poor attitude, great attitude, high empathy, low empathy, low attention, irate mood, and other suitable classifications. The combinations of scores and user characteristics for each user segment classification 139 can vary and can be dynamically adjusted.

Likewise, the agent segment classification 160 can be updated based on the recent communication session with the user client device 106. The user segment classification 139 can be stored in the user account 130, and the agent segment classification 160 can be stored in the agent account 133. Then, the matching service 121 can proceed to the end.

Figure 2B:
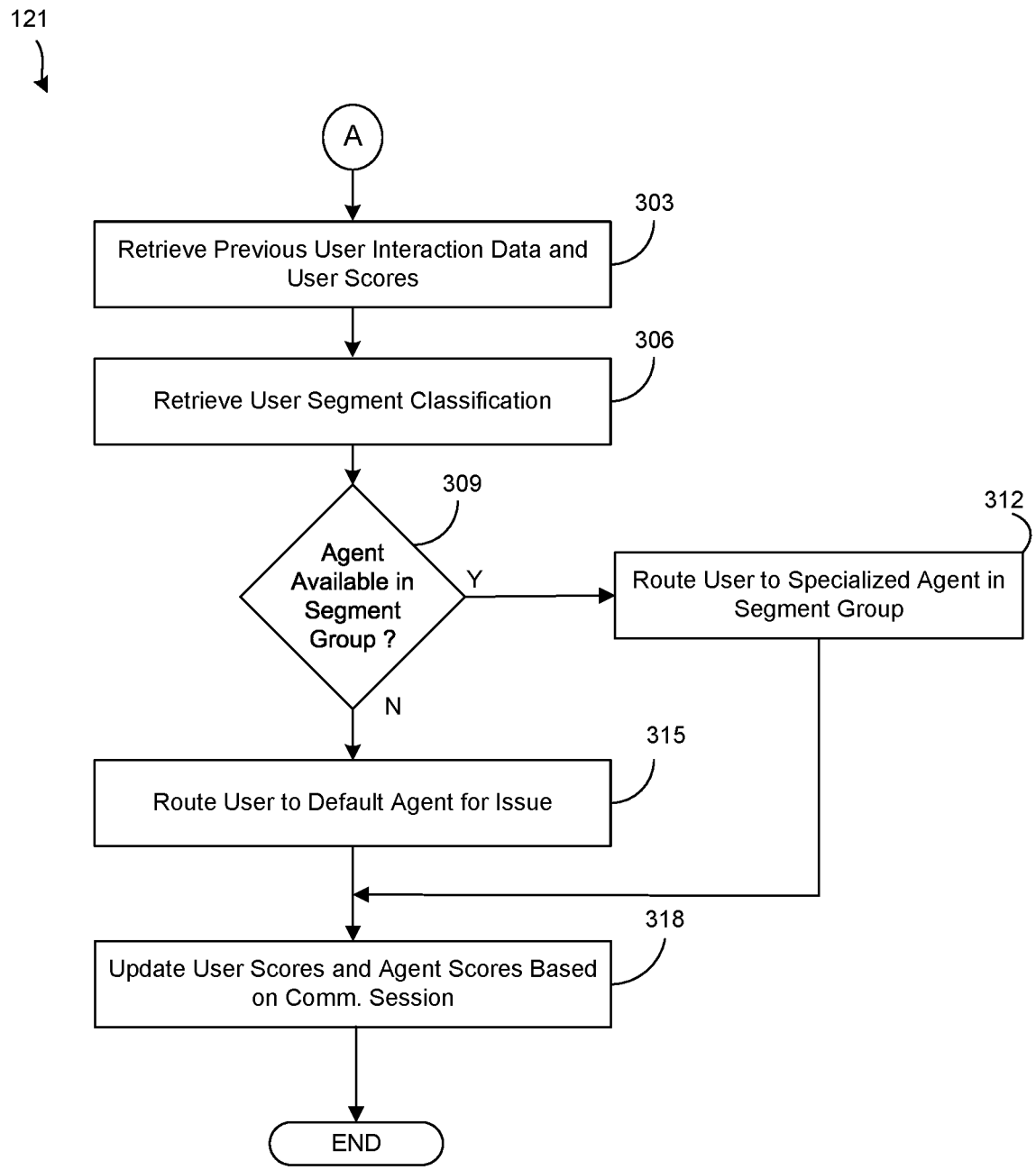
FIG. 2B is a flowchart illustrating one example of functionality implemented as portions of a matching service executed in a computing environment in the networked environment of FIG. 1 according to various embodiments of the present disclosure.

Referring next to FIG. 2B, shown is a flowchart that provides one example of the operation of a matching service 121 for matching a user to agent in a customer service context according to various embodiments. It is understood that the flowchart of FIG. 2B provides merely an example of the many different types of functional arrangements that may be employed to implement the operation of the portion of the matching service 121 as described herein. As an alternative, the flowchart of FIG. 2B may be viewed as depicting an example of elements of a method implemented in the computing environment 103 (FIG. 1) according to one or more embodiments. In some alternative embodiments, the communication service 118 and/or the scoring service 124 may be involved in implementing portions of the operations for FIG. 2B.

Beginning with box 225, it is assumed that a request to initiate a communication session has been received by a user client device 106. It has been determined that the user client device 106 has had a previous interaction with the computing environment 103. As a result, the matching service 121 can involve retrieving the user scores 136 and the user interaction data 142 from the data store 115.

Next, in box 228, the matching service 121 can involve retrieving the user segment classification 139. In some embodiments, a combination of one or more of the user segment classification 139, the user scores 136, and the user interaction data 142 can be used for identifying one or more agent segment classifications 160.

In box 231, the matching service 121 can determine whether an agent is available in the one or more agent segment classifications 160 that have been selected. In some cases, if one or more agent segment classifications 160 are determined, then an order of priority can be determined among the one or more agent segment classifications 160. If an agent is available in one or more of the agent segment classifications 160, then the matching service 121 proceeds to box 234. If an agent is not available in one or more of the agent segment classifications 160, then the matching service 121 proceeds to box 237.

In box 234, the matching service 121 can route the user client device 106 to a special agent in the selected one or more agent segment classifications 160. For example, the selected agent segment classification 160 can be a high attention group. If one of the five agents in the high attention group is available, then the matching service 121 will route the user client device 106 to the available agent in the high attention group. It is also assumed that the available agent is capable of resolving the specific issue that the customer desires to address. Thus, the high attention group can exist among the group of agents that handle card cancellations. After the communication session has terminated, then data can be collected from the communication session and stored in the user interaction data 142.

In box 237, the matching service 121 can route the user client device 106 to a default or any available agent that is capable of handling the requested task (e.g., card contraction, product support, billing). After the communication session has terminated, then data can be collected from the communication session and stored in the user interaction data 142.

In box 240, the matching service 121 can update the user scores 136 based on the recent communication session stored in the user interaction data 142. The matching service 121 can also update the agent scores 157 based on the stored communication session as well. Then, the matching service 121 can proceed to the end.

Turning now to FIG. 3, shown is a user table 300 of examples for transforming input data elements into output data elements that can be stored in the user account 130. The user table 300 includes columns for the Interaction Type, Input Element, Transform Logic, and Output Data. The Interaction Type column can represent examples of different types of user interactions with the computing environment 103. The Input Element can represent the input elements provided by the user client device 106 for the interaction type. The Transform Logic can represent various types of functionality for interpreting and/or transforming the input data of the interaction into an output data format. The Transform Logic can also represent functionality that involves extracting portions of the input data that are relevant for assigning user segment classifications 139 and agent segment classifications 160. The Transform Logic can also represent one or more machine learning models 127 that employ natural learning processing. The Transform Logic can include determining a message intent, an intent list, an overall sentiment of a communication session, a message sentiment and other suitable natural language processing data elements. The Transform Logic can also include getting various user scores 136 and agent scores 157. Some examples of scores can include a message confidence score, an empathy score 145, a behavioral score 148, an attitude score 151, a sentiment score 154, a financial stability score, social media score, and other suitable scores.

The output data can represent data generated from the Transform Logic functionality and is stored in the user accounts 130. The output data can be used for assigning user segment classifications 139 and agent segment classifications 160.

Moving on to FIG. 4, shown is an agent table 400 of examples for transforming input data elements from an agent into output data elements that can be stored in the agent account 133. The agent table 400 can include similar columns as the user table 300. The agent table 400 illustrates different example interaction types from the user table 300. For example, the agent table 400 also includes a follow-up entry for interaction type. The agent table 400 also illustrates that similar Transform Logic can be used to generate similar output data elements (e.g., agent scores 157, message intent, message sentiment). Additionally, the output data elements can be used to determine one or more agent segment classifications 160 for an agent.

Turning now to FIG. 5, shown is a segment table 500 of examples for determining user segment classifications 139 and/or agent segment classifications 160. The segment table 500 includes columns for the Interaction Type, Input Element, Agent Segmentation, and User Segmentation. The Interaction Type column represents examples of different types of user interactions with the computing environment 103. The Input Element represents the input elements provided by the user client device 106 for the interaction type.

The Agent Segmentation includes further columns for an empathy score 145, a sentiment classification (e.g., Positive), an interaction score (e.g., 10), and an agent segment classification 160 (e.g., Premium). The User Segmentation column includes additional columns such as a user empathy score (e.g., 4), a sentiment classification (e.g., negative), an interaction score (e.g., 2), and a user segment classification 139 (e.g., High Attention).

In one non-limiting example, reference number 503 refers to a chat interaction between an agent and a client. The user segment classification 139 for a user account 130 is determined to be High Attention based on an empathy score of 4, a sentiment classification of Negative, and an interaction score of 2. The user scores 136 have been determined from the chat message in the Input element column. Next, the agent segment classification 160 is determined to be set to the Premium group. This agent segment classification 160 is based on an empathy score of 10, a sentiment classification of Positive, and an interaction score of 10. These agent scores 157 were generated from the reply chat message provided by the agent in the Input element column.

In another non-limiting example, multiple thresholds can be used in comparison to the user scores 136 in order to determine the user segment classification 139. For instance, the empathy score 145 may need to meet a first threshold, such as a threshold score of 4, and the interaction score may need to meet a second threshold, such as a threshold score of 2, in order for the user segment classification 139 to be set to the High Attention group.

Figure 6:
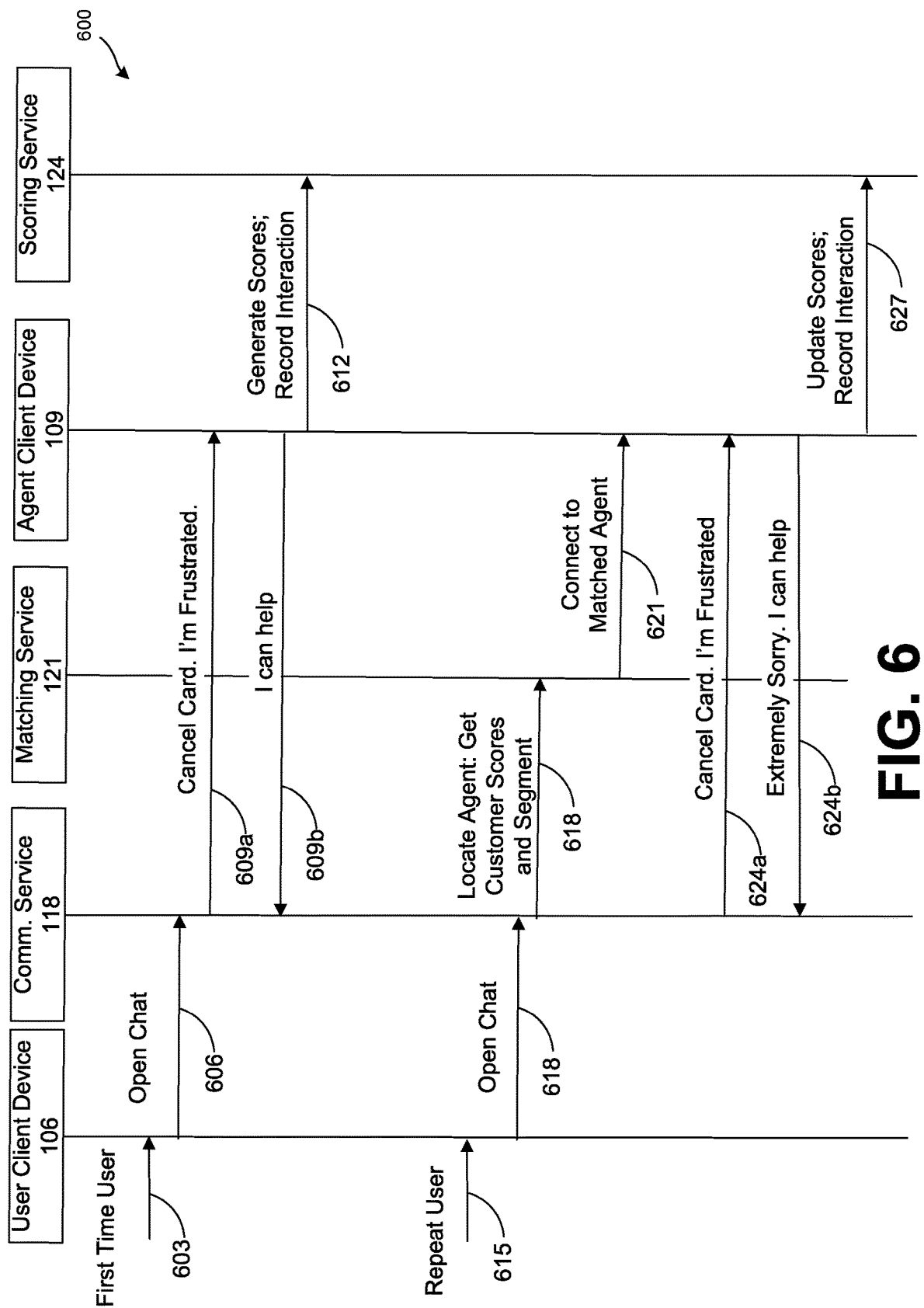
FIG. 6 is a sequence diagram of operations performed in the networked environment according to various embodiments of the present disclosure.

Next, moving to FIG. 6, shown is a sequence diagram 600 of operations performed in the networked environment 100. The sequence diagram 600 can represent an alternative embodiment from FIGS. 2A and 2B. The sequence diagram 600 relates to matching a user to an agent in a customer service context based on the moods or mental states the user has exhibited in prior interactions according to various embodiments. In an alternative embodiment, the sequence diagram 600 can represent a method of an operations implemented in the networked environment 100 or the computing environment 103.

To begin, at block 603, the user could be a first time user with no previous interactions with the computing environment 103. In one example, the user may navigate to an application or a web site of an entity. The user may desire to contact the customer service department through the application or the web site.

At block 606, the user client device 106 transmits a request to the communication service 118 to open a chat session with an agent. The communication service 118 can identify a user account 130 associated with the request. The communication service 118 can determine that the user account 130 has no previous interactions with the computing environment 103. Then, the communication service 118 can establish a chat session with an agent client device 109.

At block 609, the user client device 106 and the agent client device 109 can participate in a chat session. Block 609*a* can represent the user client device 106 transmitting a message to the agent client device 109 that states "Cancel Card. I'm frustrated." Block 609*b* can represent the agent client device 109 replying with a message that states, "I can help."

At block 612, after the end of the chat session, the scoring service 124 can process the user's message in order to generate user scores 136 and user characteristics 140 (e.g., message intent, survey results, message sentiment). The scoring service 124 can record the chat session in the user interaction data 142 and the agent interaction data 163.

At block 615, the user can request to initiate a subsequent chat session as a repeat user. The subsequent request may be related to the first issue addressed earlier or it can be related to a different issue of the user. The subsequent request can be identified from the client application 178 or a web site associated with the entity.

At block 618, the user client device 106 transmits a request to the communication service 118 to open a chat session. The communication service 118 can identify a user account 130 associated with the request. The communication service 118 can determine that the user account 130 had a previous interaction with the computing environment 103. Thus, the communication service 118 can transmit a request to the matching service 121 to retrieve one or more of the user scores 136, the user segment classification 139, and the user interaction data 142 for the user account 130. The matching service 121 can use one or more of the retrieved data elements to identify an agent segment classification 160.

At block 621, the matching service 121 can identify an available agent in the selected agent segment classification 160. In some embodiments, there may be a ranking of multiple agent segment classifications 160. For example, the matching service 121 can attempt to identify an available agent in the High Attention group first. If there are no available agents, then the matching service 121 can attempt to identify an available agent in the Medium Attention group. If there are no available agents in either of these agent groups, then the matching service 121 can assign an agent from a default group.

At block 624, the user client device 106 and the agent client device 109 can communicate in a chat session. Block 624*a* can represent the user client device 106 stating, "Cancel my credit card. I'm frustrated." Block 624*b* can represent the agent client device 109 stating, "I'm extremely sorry. I can help resolve this situation for you."

At block 627, the chat has been terminated. The chat session can be stored as user interaction data 142 and/or the agent interaction data 163. The scoring service 124 can update the user scores 136 and the agent scores 157 based on one or more of the messages in the chat session. Then, the sequence 600 proceeds to the end.

A number of software components previously discussed are stored in the memory of the respective computing devices and are executable by the processor of the respective computing devices. In this respect, the term "executable"

means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagram of FIGS. 2A, 2B and 6 represent the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagram of FIGS. 2A, 2B and 6 follow a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagram of FIGS. 2A, 2B and 6 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, and/or Z, or any combination thereof (e.g., X; Y; Z; X and/or Y; X and/or Z; Y and/or Z; X, Y, and/or Z, etc.). Thus, such disjunctive language is not generally intended to, and should not, imply that certain embodiments require at least one of X, at least one of Y, and/or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine-readable instructions stored in the memory that, when executed by the processor, cause the computing device to at least:
      initiate a first communication session between a client device of a user and a first agent client device, the first communication session occurring by a voice or message application;
      generate interaction data for a user account associated with the user from the first communication session;
      receive a user request to initiate a second communication session for the user, the user request being associated with the user account;
      identify an agent account of a second agent for the second communication session based at least in part on the interaction data for the user account; and
      initiate a second communication session, via the voice or message application, for the user between the client device and a second agent client device associated with the agent account.

2. The system of claim 1, wherein the first communication session is initiated based at least in part on a request received from the client device, the request being associated with a selection of a component on a web page by the client device.

3. The system of claim 2, wherein initiating the first communication session further causes the computing device to at least:
   determine that the request to initiate the first communication session for the client device is a first interaction with the computing device, wherein the determination of the first interaction causes the generation of the interaction data.

4. The system of claim 1, wherein initiating the first communication session further causes the computing device to at least:
   determine a user intent of the user operating the client device based at least in part on a request; and
   route the client device to the first agent client device based at least in part on the user intent.

5. The system of claim 1, wherein the machine-readable instructions, when executed by the processor, cause the computing device to at least:
   determine a user segment classification for the user account of the user based at least in part on a user characteristic identified in the first communication session.

6. The system of claim 5, wherein the machine-readable instructions, when executed by the processor, cause the computing device to at least:
   update an agent segment classification for a first agent account based at least in part on the first communication session.

7. The system of claim 1, wherein the interaction data comprises at least one of survey results, a chat interaction, a user chat speed, a sentiment classification of the first communication session, or a user location.

8. A computer-implemented method comprising:
   initiating, by a computing device, a first communication session between a client device of a user and a first agent client device, the first communication session occurring by a voice or message application;
   generating, by the computing device, interaction data for a user account associated with the user from the first communication session;
   receiving, by the computing device, a user request of the user to initiate a second communication session, the user request being associated with the user account;
   identifying, by the computing device, an agent account of a second agent for the second communication session based at least in part on the interaction data for the user account; and
   initiating, by the computing device, the second communication session, via the voice or message application, for the user between the client device and a second agent client device associated with the agent account.

9. The method of claim 8, wherein the first communication session is initiated based at least in part on a request received from the client device, the request being associated with a selection of a component on a web page by the client device.

10. The method of claim 9, wherein initiating the first communication session further comprises:
    determining, by the computing device, that the request to initiate the first communication session for the client device is a first interaction with the computing device, wherein the determination of the first interaction causes the generation of the interaction data.

11. The method of claim 8, wherein initiating the first communication session further comprises:
    determining, by the computing device, a user intent of the user operating the client device based at least in part on a request; and
    routing, by the computing device, the client device to the first agent client device based at least in part on the user intent.

12. The method of claim 11, further comprising:
    determining, by the computing device, a user segment classification for the user account of the user based at least in part on a user characteristic identified in the first communication session.

13. The method of claim 12, further comprising:
    updating, by the computing device, an agent segment classification for a first agent based at least in part on the first communication session.

14. The method of claim 8, wherein the interaction data comprises at least one of survey results, a chat interaction, a user chat speed, a sentiment classification of the first communication session, or a user location.

15. A non-transitory computer readable storage medium having instructions stored thereon that, in response to execution by a processor of a computing device, cause the computing device to at least:
- initiate a first communication session between a client device of a user and a first agent client device, the first communication session occurring by a voice or message application;
- generate interaction data for a user account associated with the user from the first communication session;
- receive a user request of the user to initiate a second communication session, the user request being associated with the user account;
- identify an agent account of a second agent for the second communication session based at least in part on the interaction data for the user account; and
- initiate the second communication session, via the voice or message application, for the user between the client device and a second agent client device associated with the agent account.

16. The non-transitory computer readable storage medium of claim 15, wherein the first communication session is initiated based at least in part on a request received from the client device, the request being associated with a selection of a component on a web page by the client device.

17. The non-transitory computer readable storage medium of claim 16, wherein the instructions, in response to execution by the processor, cause the computing device to at least:
- determine that the request to initiate the first communication session for the client device is a first interaction with the computing device, wherein the determination of the first interaction causes the generation of the interaction data.

18. The non-transitory computer readable storage medium of claim 15, wherein initiating the first communication session further causes the computing device to at least:
- determine a user intent of a user operating the client device based at least in part on a request; and
- route the client device to the first agent client device based at least in part on the user intent.

19. The non-transitory computer readable storage medium of claim 15, wherein the instructions, in response to execution by the processor, cause the computing device to at least:
- determine a user segment classification for the user account of the user based at least in part on a user characteristic identified in the first communication session.

20. The non-transitory computer readable storage medium of claim 19, wherein the instructions, in response to execution by the processor, cause the computing device to at least:
- update an agent segment classification for a first agent account based at least in part on the first communication session.

* * * * *